United States Patent [19]

DeWall

[11] Patent Number: 6,116,769

[45] Date of Patent: Sep. 12, 2000

[54] MUD MIXING MACHINE WITH LIFTING COUPLER

[76] Inventor: Harold O. DeWall, 1138 Lehner Ave., Escondido, Calif. 92026

[21] Appl. No.: 09/201,218

[22] Filed: Nov. 30, 1998

[51] Int. Cl.[7] ................................................ A01C 35/00
[52] U.S. Cl. .......................... 366/43; 280/47.34; 366/51; 366/65; 366/249; 366/325.4; 403/315; 403/331; 403/353
[58] Field of Search ................................. 366/43, 51, 65, 366/98, 100, 191, 201, 241, 249, 250, 251, 252, 254, 282, 283, 308, 331, 349; 403/315, 337, 353; 280/47.34

[56] References Cited

U.S. PATENT DOCUMENTS

| | | |
|---|---|---|
| 2,513,012 | 6/1950 | Dugas . |
| 2,688,473 | 9/1954 | Posch . |
| 3,042,316 | 7/1962 | Hobson . |
| 3,580,550 | 5/1971 | Hunnicutt . |
| 3,722,835 | 3/1973 | Knott . |
| 3,820,763 | 6/1974 | Questi, Sr. et al. . |
| 4,104,737 | 8/1978 | Brailsford . |
| 4,120,051 | 10/1978 | Lohning . |
| 4,147,331 | 4/1979 | Kopecky . |
| 4,422,770 | 12/1983 | Geible . |
| 4,692,028 | 9/1987 | Schave ...................................... 366/22 |
| 4,834,542 | 5/1989 | Sherwood . |
| 4,981,367 | 1/1991 | Brazelton . |
| 4,989,987 | 2/1991 | Berryman et al. . |
| 5,246,287 | 9/1993 | Isherwood et al. . |
| 5,251,979 | 10/1993 | Larsen . |
| 5,277,491 | 1/1994 | Burnett et al. . |
| 5,397,178 | 3/1995 | Konietzko . |
| 5,419,633 | 5/1995 | Lorenzetti et al. . |
| 5,570,953 | 11/1996 | DeWall . |
| 5,580,166 | 12/1996 | Schmittchen et al. . |
| 5,676,463 | 10/1997 | Larsen . |
| 5,878,925 | 3/1999 | Denkins et al. ......................... 222/608 |
| 5,885,001 | 3/1999 | Thomas .................................... 366/308 |

OTHER PUBLICATIONS

Product Brochure of TapeTech Tool Co. Inc. of Union City, California entitled *TapeTech Automatic Taping and Finishing Drywall Tools*, which may be taken as prior art (at least one-year prior to applicant's filing date).

*Primary Examiner*—Charles E. Cooley
*Assistant Examiner*—Michael A Fleming
*Attorney, Agent, or Firm*—Loyal McKinley Hanson

[57] ABSTRACT

An apparatus for mixing powdered or premixed drywall joint compound and water to form a joint compound mixture or slurry includes a portable container rig with a container, pumping components, and mixing components on a dolly that includes an arrangement for holding the mixing components in an elevated position. A mixing element rests within the container upon the container base, while a mixing element driver assembly that is adapted to rest upon the upper lip portion of the container engages the mixing element and rotates it for mixing purposes while at the same time raising it slightly. The pumping components may include various commercially available valves and pump outlets that facilitate the filling of various tape application tools, and one preferred embodiment includes remote control components featuring automatic pump turnoff.

3 Claims, 4 Drawing Sheets

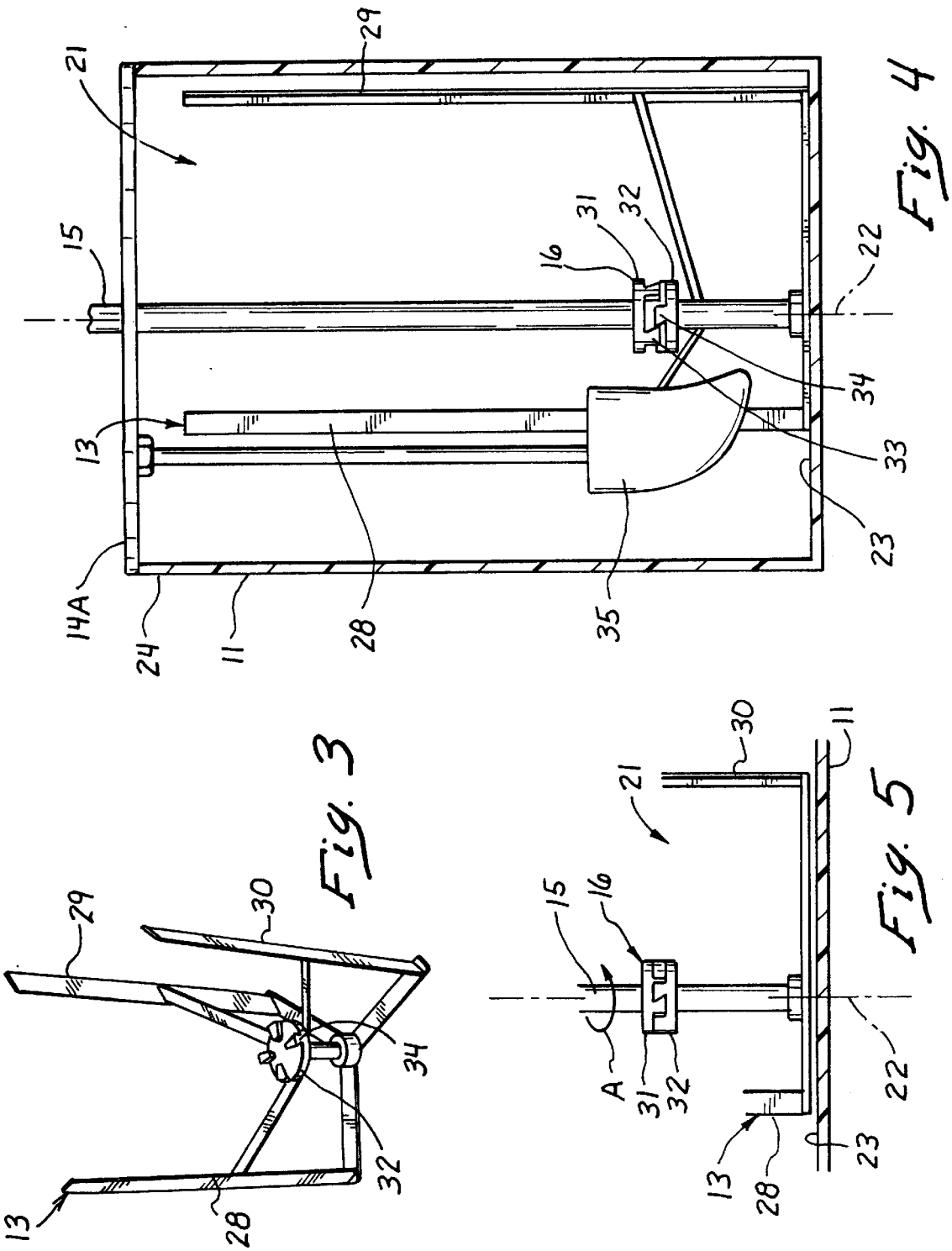

MUD MIXING MACHINE WITH LIFTING COUPLER

BACKGROUND OF THE INVENTION

1. Technical Field

This invention relates generally to construction equipment, and more particularly to a machine for mixing and dispensing a drywall joint compound or other such slurry.

2. Description of Related Art

Drywalling construction crews commonly use gypsum wallboard, or "drywall," to construct walls and ceilings. They affix drywall panels to studs and then fill and coat the joints between panels with a joint compound mixture they prepare onsite by mixing a premixed joint compound (or "mud") with water. The premixed joint compound is a damp viscous mixture with a consistency something like putty. Adding water thins it to a suitable consistency for use. After the joint compound mixture is prepared and applied it hardens, and then workers sand it to produce a smooth joint surface.

Premixed joint compound is well known to drywalling crews and is commercially available from various sources. By way of example, the premixed joint compound available form National Gypsum Company of Charlotte, N.C. under the trademark GOLD BOND is packaged in a plastic liner within a three to five gallon box. A worker mixes a batch of the joint compound mixture by emptying the premixed joint compound into a pail, adding water, and stirring for the desired consistency. He either stirs it by hand using a tool that looks something like a large potato masher, or he uses an electric drill with a mixing tool in the chuck.

After mixing, the worker dispenses the joint compound mixture from the pail to selected drywall taping and finishing tools. He typically uses an existing type of hand operated loading pump to fill other existing automatic taping tools, finishing tools, and compound distribution tools and components. Those tools are well known in the trade and they are sold under various trademarks, including those sold under the trademark AMES by Ames Tools, Supplies, and Service of Duluth, Ga., those sold under the trademark TAPETECH by TapeTech Tool Co., Inc. of Union City, Calif., and many others.

The problem is that the mixing procedure is time consuming and messy. The worker must suspend his other high-skill drywalling activities while he mixes the next batch of joint compound mixture and otherwise attends to the joint compound mixing and distribution process. So, drywalling crews need a better way to mix and dispense joint compound.

SUMMARY OF THE INVENTION

This invention addresses the problems outlined above by providing an apparatus for mixing and dispensing joint compound mixture that includes a portable container rig outfitted with an electrically powered mixing and dispensing arrangement. A mixing element is included that automatically lifts off the bottom of the container when rotated. An electrically powered stator tube pump distributes the mixed compound through standard valves and outlets. One embodiment includes a handheld remote controller that further facilitates distribution to taping tools.

Thus, the invention facilitates joint compound mixing and distribution for more efficient use of worker time. Workers can continue to work while the apparatus mixes the next batch. Mixing is less messy and the apparatus speeds up the entire drywall finishing process.

To paraphrase some of the more precise language appearing in the claims, an apparatus for mixing premixed joint compound and water to form a joint compound mixture includes (i) a container, (ii) a motor driven pump assembly, (iii) a mixing element, (iv) a mixing element driver assembly with a motor driven drive shaft, and (v) a coupling adapted to couple the drive shaft to the mixing element while raising the mixing element above the base of the container slightly.

The container serves the function of containing the premixed joint compound and water as they are mixed to form the desired joint compound mixture. It may take the form of a seven-gallon container, and it has an interior extending along a central axis of the container from a base portion of the container to an upper lip portion of the container. The pump assembly serves the function of pumping the joint compound mixture from the container to at least one outlet. It is in fluid communication with the interior of the container (e.g., via a port in the bottom of the container) and with the outlet (e.g., through commercially available values and tool pump outlets). The mixing element serves the function of mixing the premixed joint compound and water in the container. It is adapted to be rotated within the container about the central axis of the container for mixing purposes and to rest upon the base portion of the container during periods that the mixing element is not being rotated.

The mixing element driver assembly serves the function of rotating the mixing element within the container. It includes a motor driven drive shaft and it is adapted to be set atop the lip portion of the container with the drive shaft extending along the central axis of the container to the mixing element. The coupling serves the function of removably coupling the drive shaft to the mixing element. The coupling is adapted to engage and raise the mixing element above the base portion of the container slightly when the drive shaft rotates.

One preferred embodiment includes a dolly assembly for portably supporting the other components. It also has remote control components for enabling an operator to control the pumping means and the mixing element driver means from a location removed several feet from the apparatus. In addition, a level sensor level turns the pump off automatically when the tape application tool is filled to the desired level. The following illustrative drawings and detailed description make the foregoing and other objects, features, and advantages of the invention more apparent.

BRIEF DESCRIPTION OF THE DRAWINGS

FIG. 3 is an isometric view of the mixing element;

FIG. 4 is an elevation view of the mixing element in a lowered position resulting when no rotational power is applied to the drive shaft;

FIG. 5 is an elevation showing the mixing element lifted to a raised position resulting when rotational power is applied to the drive shaft.

DESCRIPTION OF THE PREFERRED EMBODIMENTS

Figure 1:
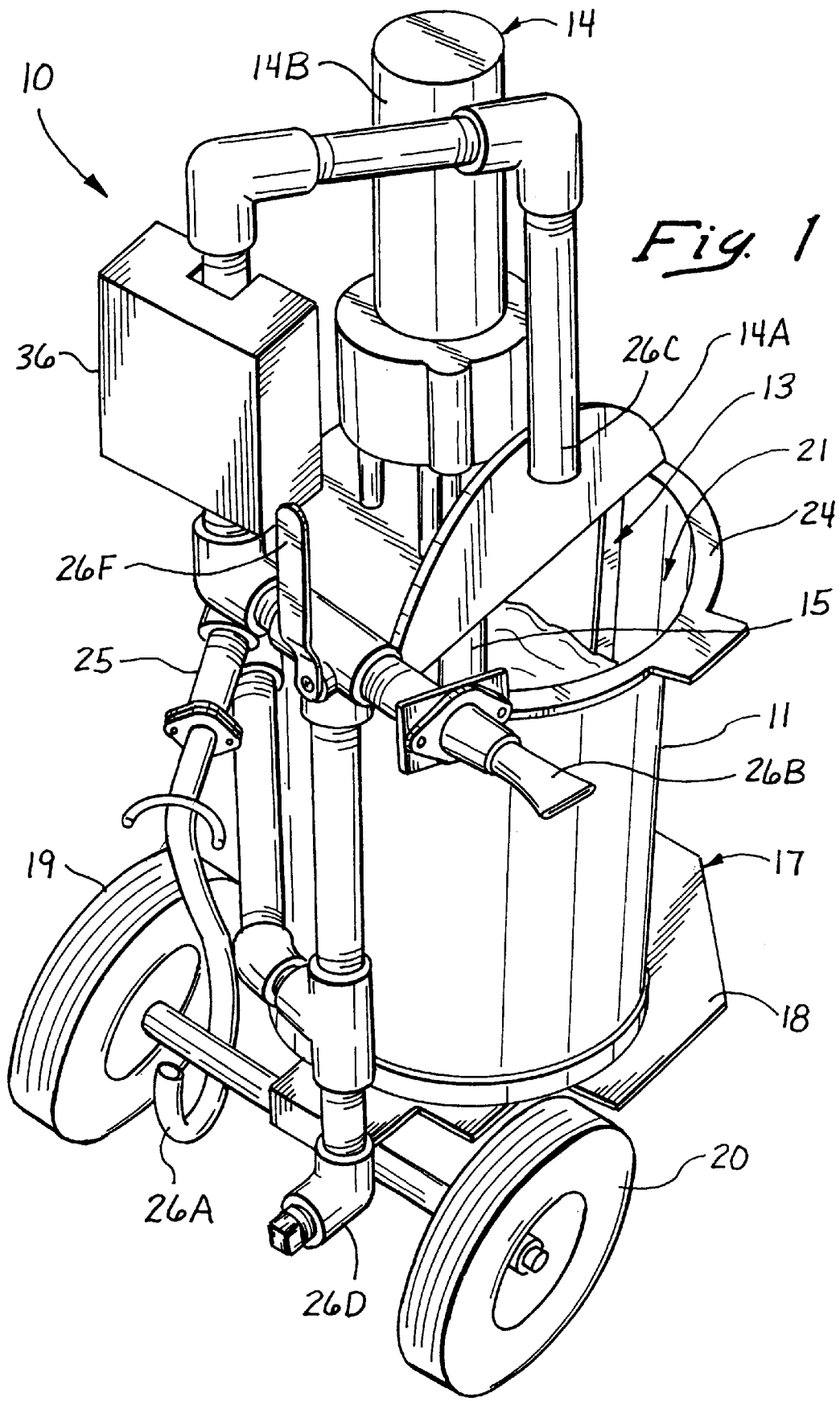
FIG. 1 of the drawings is an isometric view of an apparatus or mud mixing machine constructed according to the invention.

FIGS. 1–5 show various aspects of a mud mixing machine or apparatus 10 constructed according to the invention for mixing premixed joint compound and water to form a joint compound mixture. Generally, the apparatus 10 includes a container 11 (FIGS. 1, 2, 4, and 5), a motor driven pump assembly 12 (FIG. 2), a mixing element 13 (FIGS. 1, 3, 4, and 5), a mixing element driver assembly 14 (FIGS. 1 and 2) with a motor driven drive shaft 15 (FIGS. 1, 2, 4, and 5), and a coupling 16 (FIGS. 4 and 5). Those components are supported upon a dolly assembly 17 (FIG. 1) to form a portable rig. The dolly assembly 17 includes a platform 18 on two wheels 19 and 20, although any of various other portable carts and the like may be used instead. The container 11 rests atop the platform 18, where it is secured by suitable means, and the motor driven pump assembly 12 is mounted underneath the platform 18 where it is connected in fluid communication with the container 11 and suitable distribution plumbing.

Consider the container 11 in further detail. An apparatus constructed according to the invention includes container means for containing the premixed joint compound and water as they are mixed to form the joint compound mixture. The illustrated apparatus 10 includes the container 11 for that purpose. The container 11 has a 7.5-gallon interior 21 (FIGS. 1, 4, and 5) extending along a central axis 22 of the container 11 (FIGS. 4 and 5) from a base portion 23 of the container 11 (FIGS. 4 and 5) to an upper lip portion 24 of the container (FIGS. 1 and 4). Any of various container configurations may be employed without departing from the inventive concepts disclosed. The illustrated container 11 takes the form of a 7.5-gallon plastic bucket with an inside diameter measuring roughly 14 inches or so, although other capacities may suffice (e.g., ten to twelve gallon containers) depending on the amount of premixed joint compound to be mixed. The 7.5-gallon size works well for a conventional 47-pound box of premixed joint compound.

Figure 2:
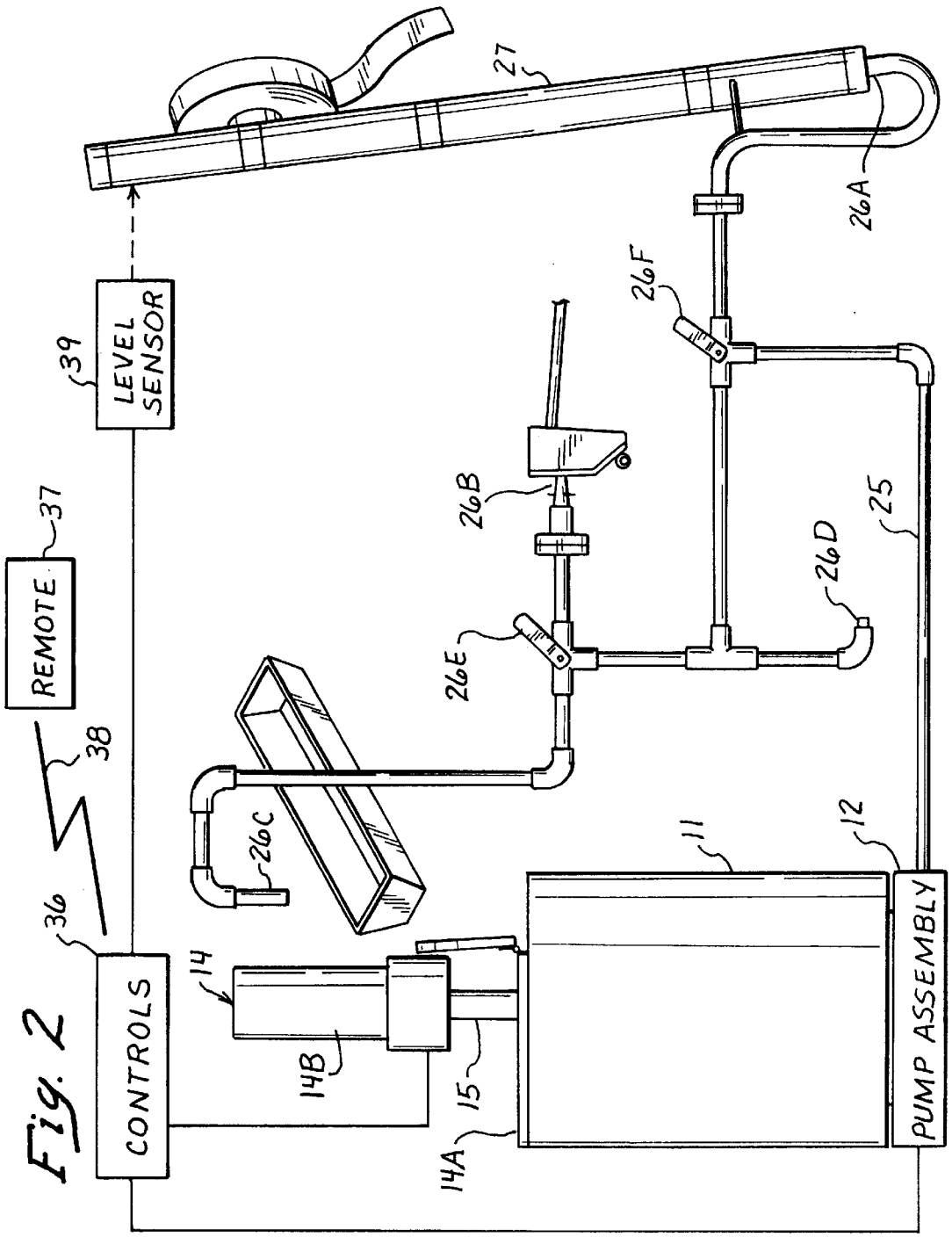
FIG. 2 is a diagrammatic representation of the apparatus that focuses on the dispensing arrangement and controls.

Next consider the motor driven pump assembly 12 in further detail. An apparatus constructed according to the invention includes pumping means for pumping the joint compound mixture from the container to at least one outlet. The illustrated apparatus 10 includes the motor driven pump assembly 12 for that purpose. It takes the form of an electrically powered stator tube pump and it pumps the joint compound mixture from the container 11 through suitable plumbing 25 (FIGS. 1 and 2) to at least one outlet 26A (e.g., a conventional outlet that mates with a conventional taping tool 27). The plumbing 25 is a combination of pipes or other conduit, valves, and outlets (outlet fittings) that preferably includes various conventional valves and outlet fittings for filling other drywalling tools, including a skim box, a nail spotter tool, an angle tool, and a mud pan, for connecting to a texture spray gun, and for recirculating the mixture back into the container for additional mixing purposes. Outlets 26B, 26C, and 26D in FIGS. 1 and 2 depict these extra outlets, and valves 26E and 26F depict two conventional valves. Based upon the foregoing and subsequent descriptions, one of ordinary skill in the art can readily design and construct a motor driven pump assembly with suitable plumbing for the apparatus 10.

Next consider the mixing element in further detail. An apparatus constructed according to the invention includes mixing element means for mixing the premixed joint compound and water in the container. The illustrated apparatus 10 includes the mixing element 13 for that purpose. It is a metal structure with three vanes 28, 29, and 30 (FIG. 3) that the motor driven drive shaft 15 causes to rotate within the interior 21 of the container 11 about the central axis 22 (as depicted by an arrow A in FIG. 5) in order to mix the premixed joint compound with water to form the joint compound mixture. The mixing element 13 has a size and shape that fits within the interior 21 of the container 11 so that it can be rotated about the central axis 22 of the container 11 for mixing purposes.

During periods that the mixing element 13 is not being rotated (e.g., when the container 11 is empty and ready for premixed joint compound to be added), the mixing element 13 rests upon the base portion 23 of the container 11 under influence of gravity, as illustrated in FIG. 4. When rotated by the motor driven drive shaft 15, the mixing element rises above the base portion 23 slightly (e.g., about one-eighth inch or so) as illustrated in FIG. 5. That action is accomplished by the coupling 16 as it couples the drive shaft 15 to the mixing element 13.

Consider the mixing element driver assembly 14 and the coupling 16 in further detail. An apparatus constructed according to the invention includes mixing element driver means for rotating the mixing element within the container. The apparatus 10 includes the driver assembly 14 and its motor driven drive shaft 15 for that purpose. The driver assembly 14 is an electric motor powered unit (e.g., one-quarter horsepower electric motor) and it is adapted to rest atop the lip portion 24 of the container 11 (as illustrated in FIGS. 1, 2, and 4) with the drive shaft 15 extending along the central axis 22 of the container 11 to the mixing element 13.

An apparatus constructed according to the invention also includes coupling means for coupling the drive shaft 15 to the mixing element 13. The apparatus 10 includes the coupling 16 for that purpose, with a first coupling component 31 connected to a distal end of the drive shaft 15 and a second coupling component 32 connected to the mixing element 13. The first coupling component 31 includes four protrusions or teeth that extend downwardly at an angle to the central axis 22, while the second coupling component 32 includes four mating protrusions or teeth that extend upwardly at an angle. Only one downwardly extending protrusion 33 and one upwardly extending protrusion 34 are designated in FIG. 4 for illustrative convenience in order to keep the drawings less cluttered with reference numerals.

The protrusions angle at about thirty degrees relative to the central axis 22. When the drive shaft 15 rotates, the downwardly extending protrusions engage the upwardly extending protrusions to thereby couple rotational movement from the drive shaft 15 to the mixing element 13. In addition, when the angled protrusions engage, they also lift the mixing element 13 above the bottom portion 23 slightly. That clears the mixing element from the bottom portion with the result that the mixing element does not bind against the bottom portion and thereby impede rotation. Base upon the foregoing description, one of ordinary skill in the art can readily design and construct first and second coupling components to function as described.

In addition to the foregoing elements, a stabilizer component 35 is shown in FIG. 4. It is part of the mixing element driver assembly, and it extends downwardly into the interior 22 of the container 11. It is attached to a cover component 14A (FIGS. 1, 2, and 4) of the mixing element driver assembly 14 and it helps prevent rotation of the mixing element driver assembly 14 in a direction opposite to direction of rotation of the mixing element 13, by bearing against the joint compound mixture. The cover component 14A is attached to an electric motor component 14B as illustrated in FIG. 1 (the diagrammatic view in FIG. 2 omits the attachment for illustrative convenience) and the cover component 14A can be configured to engage or lock in position on the upper lip portion 24 of the container 11 for this purpose also, in addition to or in place of the stabilizer component 35.

FIG. 2 shows some further details of the control aspects of the illustrated apparatus 10. Electrical control components 36 are provided and they are configured according to known techniques to control the mixing element driver assembly 14 and the pump assembly 12. Preferably, the control components 36 are configured to include switches that enable an operator to selectively turn those assemblies on and off, speed controls to enable the operator to control the speed of those assemblies, and even timing controls for automatic shutoff purposes.

A remote control component 37 is included. It serves the function of enabling an operator to control the pumping assembly 12 and the mixing element driver assembly 14 from a location removed several feet from the apparatus 10. It is configured according to known techniques to communicate operator commands to the control components 36 from a location remove several feet from the control components 36. The symbol 38 depicts any of various communication links, including cabling and infrared, that link the remote control component 37 to the control components 36.

A level sensor component 39 is also included. It is configured according to known techniques to be responsive to the joint compound mixture reaching a desired level in the tape application tool 27. When that occurs, it communicates that condition to the control components 36 in order to automatically turn the pumping means off. Any of various sensing techniques may be employed, including a sensitive microswitch with an actuator placed near a full position on the tool 27. Based upon the foregoing descriptions, one of ordinary skill in the art can readily design and construct suitable control components, remote control components, and level sensor components to function as described.

Figure 6:
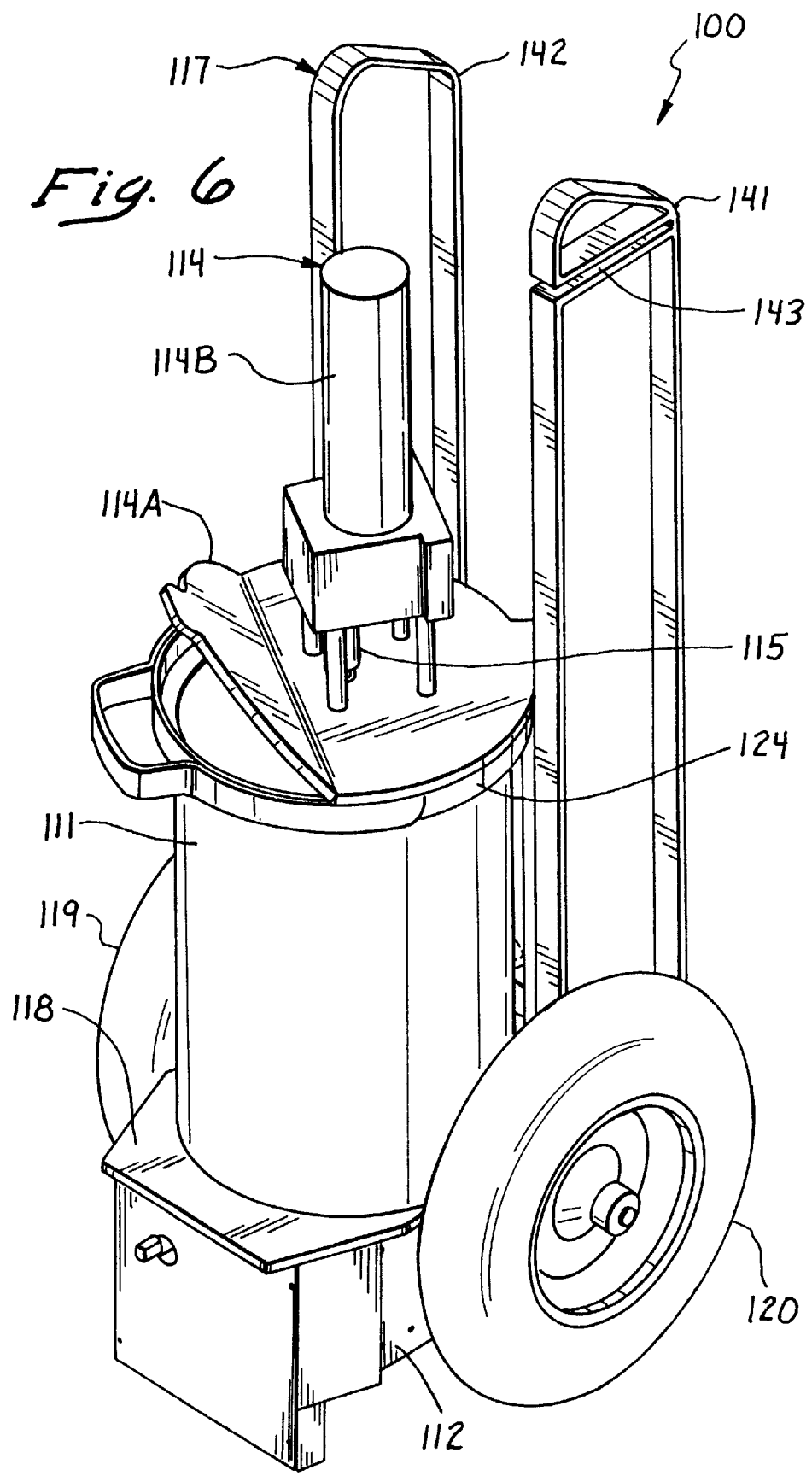
FIG. 6 is an isometric view of a further refined second embodiment of the invention.

FIG. 6 illustrates a second embodiment of the invention that is designated as an apparatus 100. It is similar to the apparatus 10 in many respects and so only differences are described in further detail. For convenience, reference numerals designating parts of the apparatus 100 are increased by one hundred over those designated related parts of the apparatus 10.

Similar in some respects to related parts of the apparatus 10, the apparatus 100 includes a container 111 on a platform 118 of a dolly assembly 117, together with a motor driven pump assembly 112 underneath the platform 118 and a mixing element driver assembly 114 with motor driven drive shaft 115, a cover component 114A that rests atop an upper lip portion 124 of the container 111, and a motor component 114B. It includes control components also, but they are mounted out of view in FIG. 6. One major difference is that the dolly assembly 117 has two handles 141 and 142 that extend to a height above the mixing element driver assembly 114, and at least one of the handles (the handle 141 in FIG. 6) includes a slot 143 that is shaped and dimensioned to receive a portion of the cover component 114A. That way the handle 141 can support the entire mixing element driver assembly 114 in a raised position above the container 111 so that the operator has better access to the interior of the container 111 when desired without having to move the mixing element driver assembly 114 very far.

Thus, the invention provides an apparatus for mixing and dispensing joint compound mixture that includes a portable container rig outfitted with an electrically powered mixing and dispensing arrangement that significantly facilitates joint compound mixing and distribution for more efficient use of worker time. Workers can continue to work while the apparatus mixes the next batch. Mixing is less messy and it has been found in extensive testing at actual job sites that the apparatus significantly speeds up the entire drywall finishing job.

Although an exemplary embodiment has been shown and described, one of ordinary skill in the art may make many changes, modifications, and substitutions without necessarily departing from the spirit and scope of the invention. Of course, an apparatus constructed according to the invention may be used for mixing powdered joint compound with water within the scope of the claims. Moreover, the apparatus can, through suitable mechanical means, be powered with one motor.

What is claimed is:

1. An apparatus for mixing premixed joint compound and water to form a joint compound mixture, comprising:

container means for containing the premixed joint compound and water as they are mixed to form the joint compound mixture, including a container having an interior extending along a central axis of the container from a base portion of the container to an upper lip portion of the container;

pumping means for pumping the joint compound mixture from the container to at least one outlet, including a motor driven pump assembly in fluid communication with the interior of the container and the outlet;

mixing element means for mixing the premixed joint compound and water in the container, including a mixing element within the interior of the container that is adapted to fit within the interior of the container, to be rotated about the central axis of the container for mixing purposes, and to rest upon the base portion of the container during periods that the mixing element is not being rotated;

mixing element driver means for rotating the mixing element within the container, including a driver assembly with a motor driven drive shaft, which driver assembly includes a cover component that is adapted to rest atop the lip portion of the container with the drive shaft extending along the central axis of the container to the mixing element;

coupling means for removably coupling the drive shaft to the mixing element, including a coupling adapted to engage and raise the mixing element above the base portion of the container slightly when the drive shaft rotates, said coupling including a first coupling component connected to the drive shaft and a second coupling component connected to the mixing element, which first coupling component is adapted to removably engage the second coupling component when rotated in order to rotate the mixing element while raising the mixing element slightly above the base portion of the container; and dolly means for portably supporting the container means, pumping means, mixing element means, mixing element driver means, and coupling, said dolly means including a handle defining a slot that is shaped and dimensioned to receive a portion of the cover component in order to function as means for holding the driver assembly in a position raised above the upper lip portion of the container.

2. An apparatus as recited in claim 1, further comprising remote control means for enabling an operator to control the pumping means and the mixing element driver means from a location removed several feet from the apparatus.

3. An apparatus as recited in claim 1, further comprising level sensor means responsive to the joint compound mixture reaching a desired level in a tape application tool for automatically turning the pumping means off.

* * * * *